(12) United States Patent
Rice

(10) Patent No.: US 6,553,945 B2
(45) Date of Patent: Apr. 29, 2003

(54) ANIMAL JAW SUPPORT DEVICE

(75) Inventor: Ingrid C. Rice, North Vancouver (CA)

(73) Assignee: Pocket Pet Concepts Inc., North Vancouver (CA)

( * ) Notice: Subject to any disclaimer, the term of this patent is extended or adjusted under 35 U.S.C. 154(b) by 0 days.

(21) Appl. No.: 09/975,009

(22) Filed: Oct. 12, 2001

(65) Prior Publication Data

US 2002/0043219 A1 Apr. 18, 2002

(30) Foreign Application Priority Data

Oct. 16, 2000 (CA) ................................................ 2323228

(51) Int. Cl.[7] .............................. A01K 25/00; A61F 5/00
(52) U.S. Cl. ........................ 119/821; 119/831; 119/850; 128/97.1; 128/857; 602/902
(58) Field of Search ................................. 119/821, 850, 119/831, 837, 855; 128/848, 97.1, 845, 857; 602/61, 17, 902

(56) References Cited

U.S. PATENT DOCUMENTS

| | | | | |
|---|---|---|---|---|
| 1,110,772 A | * | 9/1914 | Gunderman | 128/848 |
| 1,216,679 A | * | 2/1917 | Foster | 128/848 |
| 1,247,222 A | | 11/1917 | Cauffman | |
| 1,296,946 A | * | 3/1919 | Galiardo | 128/204.11 |
| 1,519,915 A | * | 12/1924 | Johnson | 128/848 |
| 3,572,329 A | * | 3/1971 | Woskin | 2/421 |
| 3,709,225 A | * | 1/1973 | Sobel | 128/DIG. 15 |
| 3,759,256 A | * | 9/1973 | O'Malley | 602/17 |
| 3,805,782 A | * | 4/1974 | Welch | 606/204.35 |
| 4,207,881 A | * | 6/1980 | Richter | 602/17 |
| 4,603,659 A | | 8/1986 | Helphrey | |
| 4,658,811 A | * | 4/1987 | Beaird | 606/204.35 |
| 4,934,357 A | | 6/1990 | Frantzich et al. | |
| 5,343,829 A | * | 9/1994 | Lookingbill | 119/821 |
| 5,484,359 A | * | 1/1996 | Wabafiyebazu | 482/10 |
| 5,540,189 A | | 7/1996 | Masson | |
| 5,687,743 A | | 11/1997 | Goodwin | |
| 5,785,008 A | * | 7/1998 | Liu | 119/831 |
| 5,787,894 A | | 8/1998 | Holt | |
| 5,839,393 A | | 11/1998 | Rupp et al. | |
| 6,016,807 A | | 1/2000 | Lodge | |
| 6,039,710 A | * | 3/2000 | Kelley et al. | 128/857 |
| 6,126,683 A | * | 10/2000 | Momtaheni | 602/13 |
| 6,164,246 A | * | 12/2000 | Naftaly et al. | 119/720 |

FOREIGN PATENT DOCUMENTS

| | | |
|---|---|---|
| GB | 463581 | of 1891 |
| GB | 2 335 358 A | 9/1999 |
| WO | 97/24028 | 7/1997 |

* cited by examiner

Primary Examiner—Yvonne Abbott
(74) Attorney, Agent, or Firm—Oyen Wiggs Green & Mutala

(57) ABSTRACT

An animal jaw support device for use on guinea pigs, chinchillas, rabbits and other small mammals supports the jaw of an animal having weakened jaw muscles and permits the animal to strengthen its jaw muscles by opening its jaw against the elastic pressure of the device. The support device wraps around the head and jaw of the animal, is made of neoprene or other elastic material and has attachment straps to hold the device snugly in place.

6 Claims, 3 Drawing Sheets

ANIMAL JAW SUPPORT DEVICE

FIELD OF THE INVENTION

The invention pertains to a jaw support device for veterinary applications. In particular, it pertains to a jaw support device for use on small mammals such as guinea pigs, chinchillas and rabbits.

BACKGROUND

Guinea pigs, chinchillas, rabbits and other small mammals are commonly kept as pets. As these animals age, their jaw muscles often weaken. This causes the jaw to become slack and the animal open-mouthed. One result of this condition is the need for veterinary tooth grinding in such animals. Guinea pigs and many other small mammals spend a great deal of their waking hours chewing and, in a healthy animal in which the jaw muscles hold the mouth closed, the lower teeth grind against the upper teeth during such chewing, preventing the animal's teeth, which grow continuously, from becoming elongated. However, in a slack-jawed animal, such grinding is minimal and the animal's teeth require frequent grinding by a veterinarian to maintain them at a proper length.

SUMMARY OF THE INVENTION

It is an object of the invention to provide a device to support the jaw of guinea pigs and similar animals in which the jaw muscles have weakened.

It is a further object to provide such a support device that enables the animal to strengthen its jaw muscles.

In one broad aspect, the invention provides an animal jaw support device comprising an elongate body of elastic material adapted to fit around the head and jaw of a guinea pig or other small mammal. The elongate body has forward and rearward edges and longitudinal ends. Attachment straps at the longitudinal ends are adapted to attach together to hold the support device snugly around the head and jaws of the animal.

These and other objects, advantages and features of the invention will be apparent from the following description of the preferred embodiment, considered along with the accompanying drawings.

DESCRIPTION OF THE PREFERRED EMBODIMENTS

Figure 1:
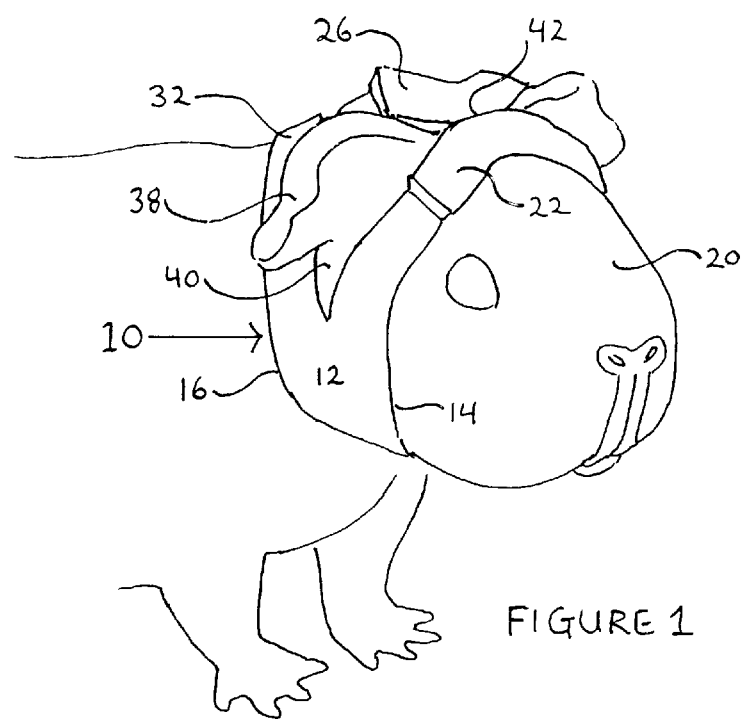
FIG. 1 is a perspective view of the front side of a guinea pig wearing the first preferred embodiment of the support device.
Figure 2:
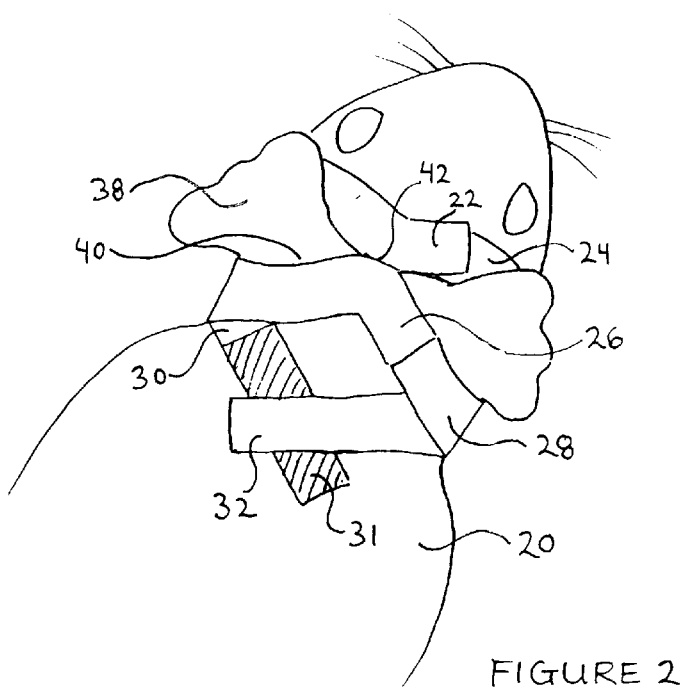
FIG. 2 is a top plan view of the front part of the guinea pig, wearing the support device of FIG. 1.
Figure 3:
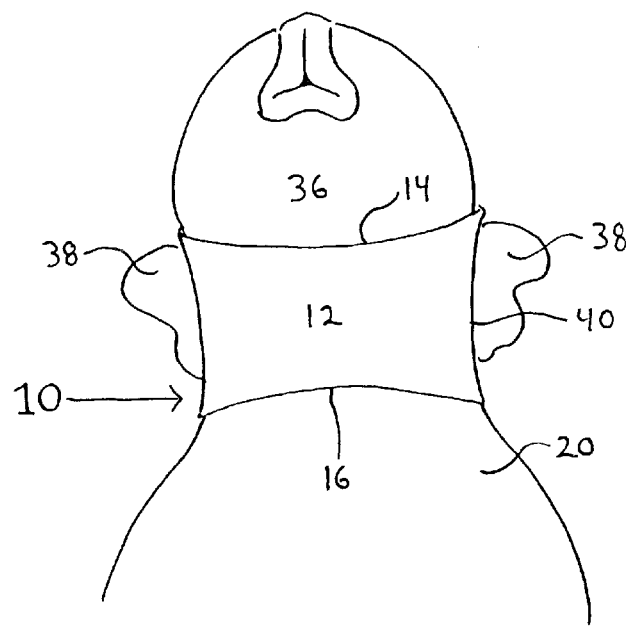
FIG. 3 is a bottom plan view of the front part of the guinea pig, wearing the support device of FIG. 1.

The support device 10 is made of a flexible, elastic material, preferably neoprene. It has an elongate body portion 12 with mating sets of attachment straps at the longitudinal ends thereof. Referring to the drawings, when the support device 10 is in place on a guinea pig 20, forward edge 14 of the device is toward the front of the animal and rearward edge 16 is toward the rear.

The support device 10 has three pairs of mating attachment straps. Forward straps 22, 24 are adapted to connect to each other, as are middle straps 26, 28 and rear straps 30, 32. Rear straps 30, 32 are preferably separate strips of neoprene that are stitched onto the support device; but they may also be integral with it.

Figure 4:
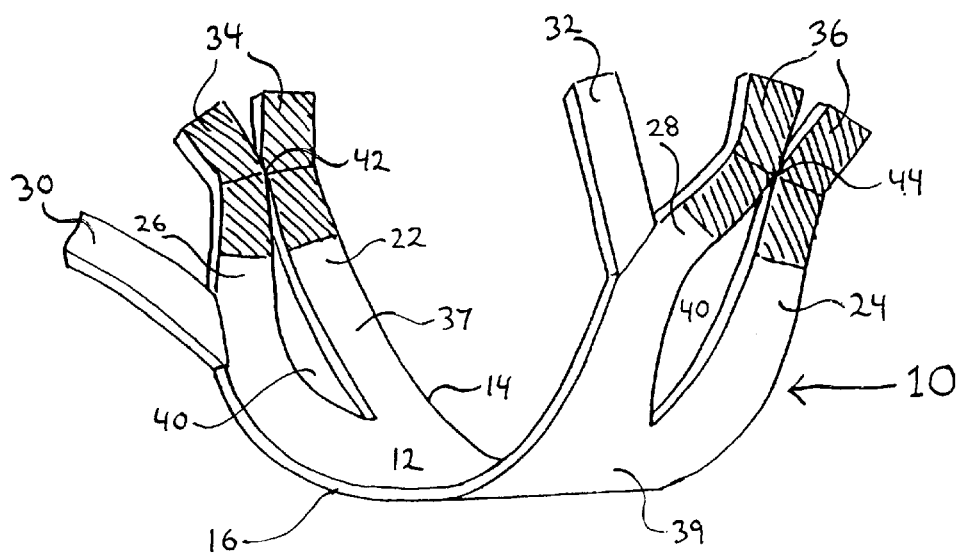
FIG. 4 is a perspective view of the first preferred embodiment of the support device.

Referring to FIG. 4, forward strap 22 and middle strap 26 have strips of Velcro (trademark) i.e. hook and loop-type fabric, 34 on inner side 37, i.e. the side of the support device that is toward the animal. Forward strap 24 and middle strap 28 have mating Velcro strips 36 on the outer side 39 of the support device adapted to attach to Velcro strips 34. Rear strap 30 has a Velcro strip 31 on the outer side 39 of the support device which attaches to a mating Velcro strip on the inner side 37 of the mating rear strap 32. The Velcro strips are attached to the straps by adhesive or stitching.

Straps 22 and 26 are connected together at point 42, by stitching at their abutting edges, forming earhole 40. Similarly, straps 24 and 28 are connected together at point 44 to form an earhole 40.

The support device 10 is applied to the guinea pig 20 by wrapping it around the muzzle of the animal so body portion 12 is under the animal's lower jaw 36, with ears 38 protruding through earholes 40, and with forward straps 22, 24 attached together by their Velcro strips 34, 36, anterior to the ears 38 of the animal and middle straps 26, 28 attached together by their Velcro strips behind the ears 38. Rear straps 30, 32 are attached together by their Velcro strips in back of the animal's neck. The rear straps 30, 32, help to hold the support device 10 in place and pull it back from, and relieve pressure on, the animal's ears. The support device is attached snugly so that the jaw, i.e. the lower jaw, of the guinea pig is held closed.

The thickness and elasticity of the material of the support device is selected such that the jaw of the animal is held closed but the animal is able to open its jaw against the pressure of the elastic material. When the device is in place on the guinea pig, the animal must open its jaw against the elastic pressure of the device in order to eat or chew. Such opening of its mouth, when eating food, forces the guinea pig to exercise, and thus to strengthen, its jaw muscles. Also, as the animal chews, the lower teeth grind against the upper teeth, reducing the need for veterinary grinding of the teeth.

For use on an average-sized guinea pig, the support device is about 8 inches (20 cm) long and one inch (2.5 cm) wide at its middle. The distance between the inner points of earholes 40 is about 2¼ inches (5.5 cm) and the width of each of the straps 22, 24, 26, 28, 30 and 32 is about ⅜ inches (1 cm). The thickness of the neoprene is about ⅛ inches (0.3 cm). The dimensions may vary depending on the size of the animal.

Figure 5:
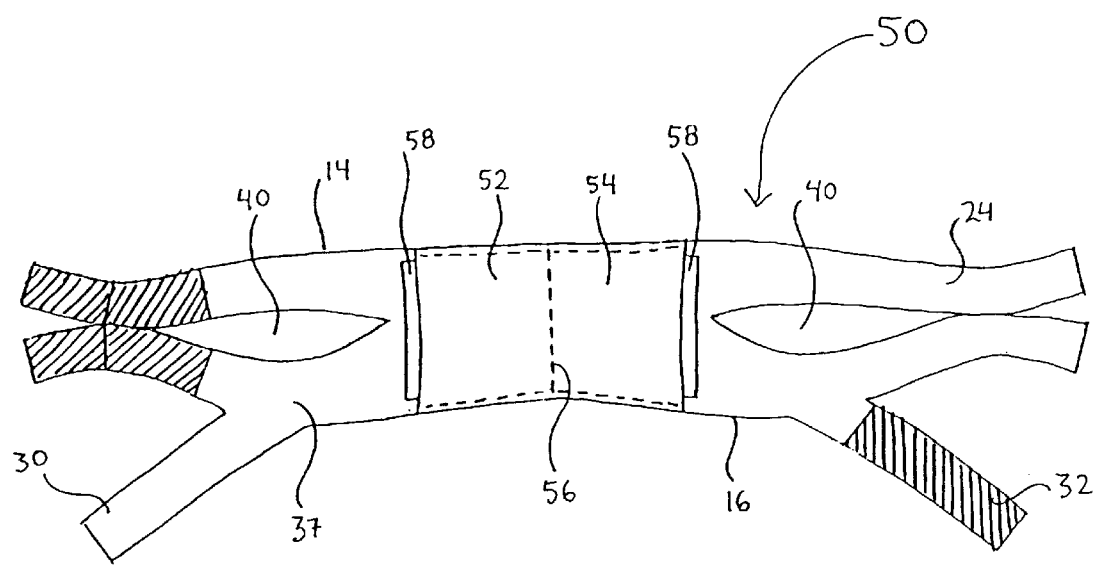
FIG. 5 is a top plan view of the second preferred embodiment of the support device.

A second embodiment of the support device is shown in FIG. 5, in which like reference numbers indicate like parts as compared to the first embodiment. Support device 50 is the same as support device 10 but includes, on its inner side 37, pad-holding pockets 52, 54.

These pockets are formed by stitching a piece of fabric, such as the fabric backing of neoprene or stretchable nylon, to the support device along the longitudinal edges thereof, and making a stitch line 56 across the body of the fabric piece between forward edge 14 and rearward edge 16 of the support device, to form the two pockets 52, 54, which are open at the outer ends thereof. Stitch line 56 is about equidistant from the longitudinal ends of the support device 50. Neoprene pads 58 can be inserted into pockets 52, 54. Preferably, a pad 58 is inserted in only one pocket or the other, for the purpose of applying more pressure on one side of the animal's jaw than the other side. It has been found that in some cases an animal's jaw muscles are weakened, and require support, substantially on the animal's right side or left side only. In such a case, better therapeutic results are achieved by increasing the pressure applied by the support device to the weakened side. This is done by means of placing pad 58 in the pocket 52 or 54 on the weakened side prior to applying the support device to the animal. The pockets are sufficiently large to accommodate two pads in a single pocket, if desired.

Though described above for use on a guinea pig, the support device may also be used on chinchillas, rabbits and similar mammals. Other small mammals, for example prairie dogs, which may be kept as pets and may be subject to jaw muscle weakening and excessive tooth growth, can also use the device. The dimensions are to be modified as required to fit animals other than guinea pigs, including larger earholes for support devices used for rabbits and chinchillas.

The preferred embodiments described above are intended to illustrate the principles of the invention, but not to limit the scope of the invention. Various other embodiments and modifications to these preferred embodiments may be made by those skilled in the art without departing from the scope of the following claims.

What is claimed is:

1. An animal jaw support device comprising an elongate body of elastic material adapted to fit around the head and jaw of a small animal selected from the group consisting of guinea pigs, chinchillas, rabbits and prairie dogs, said body having a forward edge, a rearward edge and longitudinal ends with attachment snaps at said longitudinal ends, said attachment straps comprising (i) mating forward straps at said forward edge, (ii) mating middle straps between said forward edge and said rearward edge, and (iii) mating rearward straps at said rearward edge, said straps having means for attaching said mating straps together to hold said support device snugly around the bead and jaw of said animal, said support device having earholes adapted to fit over the ears of said animal.

2. An animal jaw support device according to claim 1 wherein said mating forward straps are adapted to attach together anterior to the ears of said animal, said mating middle straps are adapted to attach together posterior to the ears of said animal and said mating rearward straps are adapted to attach together at the back of the neck of said animal.

3. An animal jaw support device according to claim 2 wherein said forward strap and said middle strap at each longitudinal end of said elongate body are connected together forming said earholes therebetween.

4. An animal jaw support device according to claim 1 wherein said means for attaching said straps together is strips of hook and loop fabric.

5. An animal jaw support device according to claim 1 further comprising a pocket on said elongate body for holding a pad to apply pressure to said jaw of said animal.

6. An animal jaw support device according to claim 5 wherein said pocket can hold said pad in a selected position to apply pressure to a left side or to a right side of said jaw.

* * * * *